United States Patent
Lill et al.

(10) Patent No.: US 8,594,969 B2
(45) Date of Patent: Nov. 26, 2013

(54) REMOTE APPLIANCE OR MACHINE MONITORING METHOD AND SYSTEM

(76) Inventors: Thomas Martin Lill, Port Huron, MI (US); Ralph Shoemaker, Shelby Township, MI (US)

(*) Notice: Subject to any disclaimer, the term of this patent is extended or adjusted under 35 U.S.C. 154(b) by 354 days.

(21) Appl. No.: 13/077,864

(22) Filed: Mar. 31, 2011

(65) Prior Publication Data

US 2011/0246124 A1    Oct. 6, 2011

Related U.S. Application Data

(60) Provisional application No. 61/341,586, filed on Apr. 1, 2010.

(51) Int. Cl.
*G06F 11/00* (2006.01)
*G06F 15/00* (2006.01)

(52) U.S. Cl.
USPC ......... 702/141; 65/29.15; 65/158; 73/862.53; 340/539.11; 701/99; 702/188; 702/189

(58) Field of Classification Search
USPC ............ 702/32, 33, 104, 105, 141, 176, 183, 702/188, 189; 65/29.15, 158; 73/862.53; 701/99; 340/511.2, 531, 539.11, 679; 8/159; 379/106.01
See application file for complete search history.

(56) References Cited

U.S. PATENT DOCUMENTS

| | | | | |
|---|---|---|---|---|
| 4,142,238 | A * | 2/1979 | Brandt et al. | 702/176 |
| 4,582,522 | A * | 4/1986 | Merz et al. | 65/29.15 |
| 4,671,124 | A * | 6/1987 | Seliga | 73/862.53 |
| 4,776,871 | A * | 10/1988 | McCoy | 65/158 |
| 4,916,439 | A | 4/1990 | Estes et al. | |
| 5,089,809 | A | 2/1992 | Carmichael, Jr. | |
| 5,680,445 | A | 10/1997 | Bogner et al. | |
| 6,424,252 | B1 | 7/2002 | Adler | |
| 6,703,930 | B2 | 3/2004 | Skinner | |
| 6,784,801 | B2 | 8/2004 | Watanabe et al. | |
| 6,873,255 | B2 | 3/2005 | Gallagher | |
| 7,409,738 | B2 | 8/2008 | Borras | |
| 7,581,272 | B2 | 9/2009 | Xie et al. | |
| 8,185,290 | B2 * | 5/2012 | Mintah et al. | 701/99 |

* cited by examiner

*Primary Examiner* — John H Le

(57) ABSTRACT

The present invention relates to methods and systems for monitoring operational cycles of one or more appliances, such as washers and dryers, and remotely indicating when such operating cycles have terminated. In one aspect, the present invention provides an appliance or machine monitoring system. The system includes a monitor and transmitter unit configured to monitor an operation cycle of an appliance or machine and transmit a wireless signal upon completion of the operation cycle. The monitor and transmitter unit includes an operation cycle sensor, a signal conditioner, a comparator, and a wireless transmitter broadcasting a wireless signal based upon the signal generated by the comparator. The system further includes a portable receiver and alert unit configured to receive signals generated by the wireless transmitter and generate a signal indicative of completion of an operation cycle of an appliance or machine.

21 Claims, 11 Drawing Sheets

REMOTE APPLIANCE OR MACHINE MONITORING METHOD AND SYSTEM

CROSS-REFERENCE TO RELATED APPLICATION

The present application claims benefit of U.S. Provisional Patent Application No. 61/341,586, filed Apr. 1, 2010, the contents of which are hereby incorporated by reference in its entirety for all purposes.

FIELD OF THE INVENTION

The present invention relates to methods and systems for monitoring operational cycles of one or more appliances, such as washers and dryers, and remotely indicating when such operating cycles have terminated.

BACKGROUND

Many households utilize appliances to perform mundane or time consuming tasks, which allows individuals to focus on other daily tasks requiring more attention. Such appliances include washing machines, dryers, dishwashers, microwaves, etc. However, while these appliances are particularly helpful in performing tasks, once operation begins the individual often losses track of the operation cycle of the appliance and the appliance goes unused for lengthy periods of time. With respect to dryers, this can be particularly problematic with clothes requiring hanging, after drying, to avoid wrinkling. With respect to washing machines, wet cloths left in washing machines over a prolonged period, particularly in tropical conditions, are susceptible to souring, mold and mildew. Still further, this can be particularly problematic when your relaying on completion of a washer or dryer in order to utilize the cloths therein for an appointment or otherwise. In any regards, while these appliances often include visual and/or audible indicators for indicating completion of an operation cycle, often these appliances are remotely located or disposed in areas that prevents them from being noticed, such as a basement or otherwise.

Some prior methods and devices have responded by providing indicators for monitoring and alerting a user of the status of an appliance. However, these devices are typically complex in design, costly, require specially trained technician for installation, are impractical or are just simply inoperable. For example, some systems require modification of the electrical system of the appliance to install monitoring and alert system. However, typically, alterations to appliances void any warrantee that the appliance may have. Also, these systems do not work on all appliances and often generate false completion signals as a result of short interruptions between operation cycle segments. Other systems have utilized plug-in devices, which monitors current to the appliance. However, again, during interruption between cycle segments the lack of current, or low current, creates a false completion signal. Alternatively, some individuals have attempted to track the operation cycle of an appliance through a timing device. However, many new appliances have variable operation time based upon operation necessities. For example, newer dryers periodically monitor moisture content within the dryer to determine completion of drying. As such, drying time continually changes not only between loads, but also during the drying cycle.

Other attempts have provided systems for monitoring appliance vibration and remotely indicating the completion of an appliance cycle. However, it has been discovered that these systems appear inoperable for lack of power, false completion readings and simply lack enablement. For example, it appears that these devices lack sufficient electrical power for monitoring operation cycle and generating wireless signals, without somehow electrically connecting the device to an AC supply. Also, as often appliances are inadvertently banged, or knocked by other individuals or other appliances, these systems would appear to generate false operation signals. More so, they are not capable of working on new 'quiet' modeled appliances, such as 'quiet washers' and 'quiet dryers', which operated with substantially lower vibration and noise. Finally, such systems do not appear to be in production and do not provide means for overcoming the aforementioned and other inherent problems.

In view of the foregoing, there is a need for improved methods and devices for monitoring operational cycles of one or more appliances or machines, such as washers, dryers, or otherwise, and remotely indicating when such operating cycles have terminated.

SUMMARY OF THE INVENTION

The present invention relates to methods and devices monitoring operational cycles of machines and appliances and remotely indicating when such operating cycles have terminated. In one configuration, the features of the present invention are predicated on new methods and devices for monitoring operational cycles of machines and appliances. In another configuration, the features of the present invention are predicated on new methods and devices for analyzing and conditioning signals generated by operation cycle monitors to provide improved accuracy. In still another configuration, the features of the present invention are predicated on new methods and devices for eliminating false readings. Other advantageous features exist as shown and described herein.

In one aspect, the present invention provides an appliance or machine monitoring system. The system includes a monitor and transmitter unit configured to monitor an operation cycle of an appliance or machine and transmit a wireless signal upon completion of the operation cycle. The monitor and transmitter unit includes an operation cycle sensor, the operation cycle sensor generates signals based upon operation status of an appliance or machine. The monitor and transmitter unit further includes a signal conditioner, the signal conditioner receives and modifies signals generated by the operation cycle sensor. The monitor and transmitter unit further includes a comparator, the comparator compares amplitude of the modified signals with a predetermined amplitude trip point and generates a signal once the amplitude of the modified signal falls below the predetermined amplitude trip point for a predetermined time period to indicate completion of the operation cycle of the appliance or machine being monitored. The monitor and transmitter unit further includes a wireless transmitter broadcasting a wireless signal based upon the signal generated by the comparator. The system further includes a portable receiver and alert unit configured to receive signals generated by the wireless transmitter and generate a signal indicative of the completion of the operation cycle of the appliance or machine.

In another aspect, the present invention provides an appliance or machine monitoring system. The system includes a monitor and transmitter unit configured to monitor an operation cycle of an appliance or machine and transmit a wireless signal upon completion of the operation cycle. The monitor and transmitter unit includes a three-axis accelerometer sensor, the accelerometer sensor generates signals indicative of acceleration of an appliance or machine along three axes. The monitor and transmitter unit further includes a signal conditioner, the signal conditioner receives and modifies signals generated by the accelerometer sensor to form a moving average amplitude. The monitor and transmitter unit further includes a comparator, the comparator compares the moving average amplitude of the modified signals with a predetermined amplitude trip point and generates a signal once the average amplitude falls below the predetermined amplitude trip point for a predetermined time period to indicate completion of the operation cycle of the appliance or machine being monitored. The monitor and transmitter unit further includes a sensitivity selector switch, the sensitivity selector switch being configured to adjust amplitude of the moving average amplitude, adjust the predetermined amplitude trip point, or both. The monitor and transmitter unit further includes a wireless transmitter, the wireless transmitter broadcasts a wireless signal based upon the signal generated by the comparator. The monitor and transmitter unit further includes a DC battery providing power to the monitor and transmitter unit circuitry. The monitor and transmitter unit includes a housing unit configured for supporting and housing components of the monitor and transmitter unit. The monitor and transmitter unit further includes a releasable attachment unit configured for releasable attachment of the monitor and transmitter unit to a surface of an appliance or machine. The system further includes a portable receiver and alert unit configured to receive signals generated by the wireless transmitter and generate an audio, visual or audio and visual alert indicating completion of the operation cycle of the appliance or machine. The portable receiver and alert unit circuitry being powered by a DC battery.

In another aspect, the present invention provides a method of monitoring an operation cycle of an appliance or machine. The method includes connecting an operation cycle sensor to an appliance or machine, the operation cycle sensor generates signals based upon operation cycles of the appliance or machine. The method further includes conditioning the signals generated by the operation cycle sensor to form a moving average amplitude that is greater than an amplitude setting of a predetermined amplitude trip point when the appliance or machine being monitored is in operation. The method further includes monitoring time periods after the moving average amplitude falls below the amplitude setting of the predetermined amplitude trip point to indicate completion of the operation cycle of the appliance or machine being monitored. The method further includes transmitting a wireless signal after the time period exceeds a predetermined time value. The method further includes generating an audio or visual alert signal with a portable receiver and alert unit based upon the wireless signal received by the portable receiver and alert unit.

The above-described and other features and advantages of the present invention will be appreciated and understood by those skilled in the art from the following detailed description, drawings, and appended claims.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

The present invention provides methods and devices for monitoring the operation cycle of machines and in one particular application, appliances. Through the feature of the present invention operation cycles of machines can be monitored and a signal sent to a user indicating the completion of the operation cycle. Advantageously, this saves time and money by increasing efficiency of machine production. The features of the present invention are derived, at least in part, upon new operation detection devices and methods. The features of the present invention are also derive, at least in part, upon new signal analysis and conditioning devices and methods to improve accuracy and eliminate false alerts.

The methods and devices can be used in various application including monitoring operational cycles of machines. In one particular application, the methods and devices are used to monitor the operation cycles of appliances, such as washer, dryers, dishwashers, microwaves, etc. However, the methods and devices can be utilized on other machines including, without limitation, sump pumps, environmental temperature chambers, computers, machines with vibration feeders for feeding material into machines and on conveyors, transformers, motors, CNC lathes, CNC Mills, illumination devices, electric generators, combustion engines, water pipes, fans and blowers, or otherwise.

It should be understood that while certain exemplary embodiments, herein, refer to the use of the present invention with appliances, such exemplary embodiments may be equally used with other machines, particularly machines generating displacement characteristics such as displacement, vibration and acceleration, which can be used to monitored an operational condition status thereof. As such, unless otherwise noted, appliances should be defined to include other machines.

Figure 1:
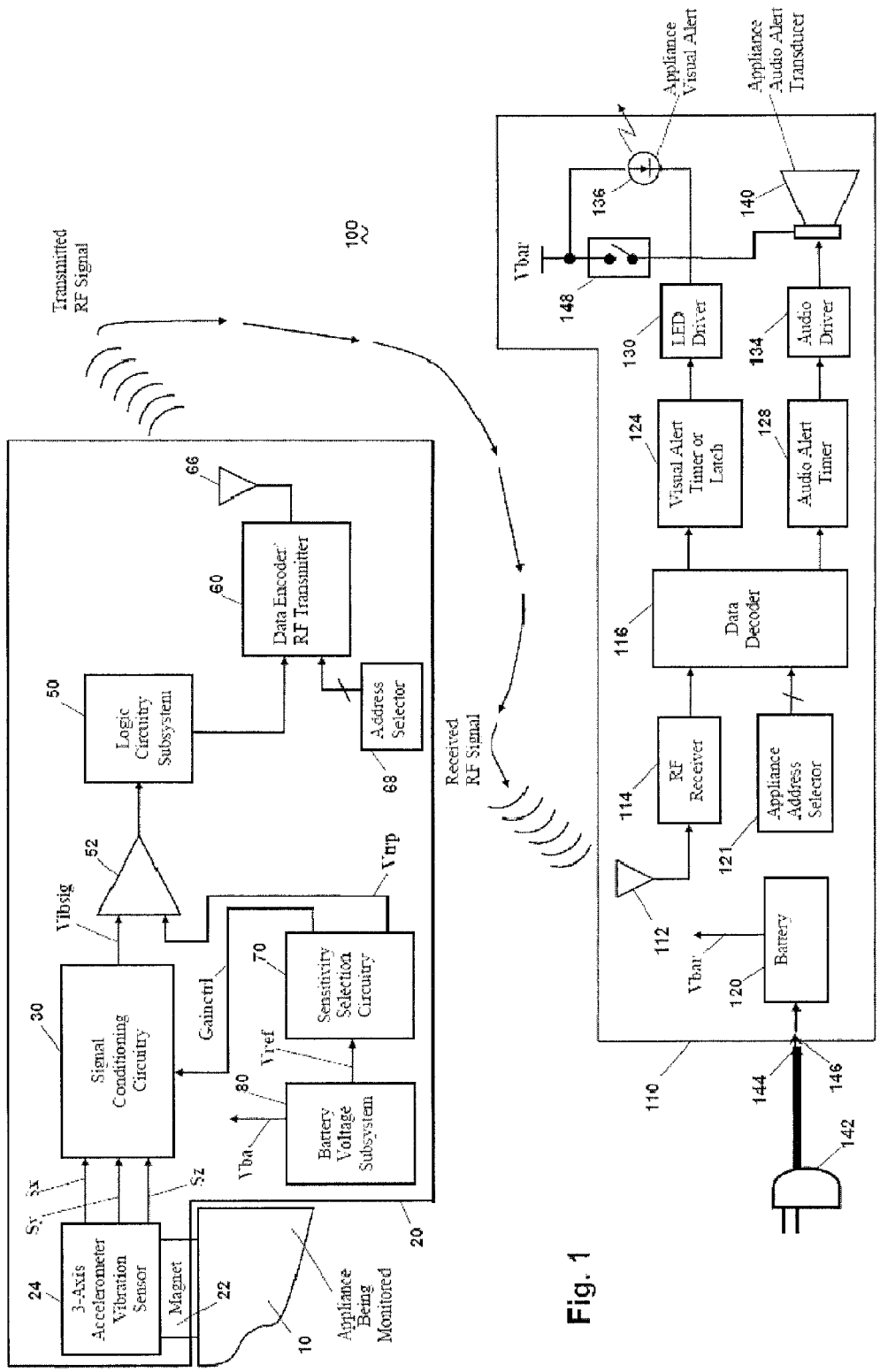
FIG. 1 illustrates a block diagram of an exemplary embodiment of a remote monitor and alert system according to the teachings of the present invention.

In general, referring to FIG. 1, the present invention provides a remote appliance monitoring and alert system 100 for monitoring the operational cycle of an appliance 10. The system 100 includes an operation cycle sensor, e.g. Vibration Sensor 24, Acceleration Vibration Sensor 24, Magnetic Field Sensor 26 or Audio Microphone Sensor 28, configured to monitor the operational status of appliance 10 and generate a signal therefor. The signal is received by a signal conditioning circuit 30 and a new signal is generated having an average amplitude. The average amplitude is compared with a predetermined amplitude trip point through a comparator 52. Once the average amplitude falls below the predetermined amplitude trip point a wireless signal is broadcasted through RF transmitter 64. The wireless signal is received by receiver alert unit 110, which in one exemplary embodiment is remotely disposed with respect to the remote appliance monitoring and alert system 100, and in one particular exemplary embodiment disposed with a user of the appliance 10. Based upon the signal received from the remote appliance monitoring and alert system 100, the receiver alert unit 110 provides an audio alert, visual alert, or both, indicating that the operational cycle of the appliance 10 is complete.

In greater detail, FIG. 1 illustrates a block diagram of the electrical schematic drawing of the overall electronic system of the Remote Appliance Monitoring and Alert System 100, including the Appliance Monitor and Transmitter Unit 20 and the Receiver/Alert Unit 110. Referring to FIG. 1, a Remote Appliance or Machine Monitoring System 100 is shown. Throughout the remainder of this document, all references to "an appliance", "the appliance" or "the appliance being monitored" shall be equally applicable to and inclusive of any kind of machine which may be monitored using this method and system. System 100 includes an Appliance Monitor and Transmitter Unit 20, hereinafter referred to as AMTU 20, and the Remote Receiver/Alert Unit 110, hereinafter referred to as RRAU 110.

The Appliance Monitor and Transmitter Unit 20 (AMTU 20) of one embodiment of the invention is shown in FIG. 1. This AMTU 20 includes an operation cycle sensor, such as Vibration Sensor 24 or other operation cycles sensors 24 described herein, an Attachment Apparatus 22 (which is a method to attach AMTU 20 to the Appliance Being Monitored 10 and in this embodiment is a magnet), and Signal Conditioning Circuitry 30, whose output "Vibsig" goes to the positive input of Comparator 52. The negative input of Comparator 52 comes from Sensitivity Selection Circuitry 70. Also, Sensitivity Selection Circuitry 70 sends a "Gainctrl" signal to Signal Conditioning Circuitry 30 in order to control the gain of the amplifiers contained in Signal Conditioning Circuitry 30. AMTU 20 is powered by Battery Voltage Subsystem 80. It provides battery Voltage "Vba" to all of the components contained in the AMTU 20 and provides a voltage reference "Vref" to Sensitivity Selection Circuitry 70. The output of Comparator 52 is sent to Logic Circuitry Subsystem 50, whose output is sent to Data Encoder/RF Transmitter 60. Address Selector 68 allows the user to select a unique digital identification code for the Appliance Being Monitored 10 to be used as part of the RF Transmission. Comparator 52 and Logic Circuitry Subsystem 50 turn on the Data Encoder/RF Transmitter 60 to transmit an RF Data Signal through RF Antenna 66 only when the Appliance Being Monitored 10 has reached its end-of-cycle. The RF Data Transmission sent via RF Antenna 66 is received by the RRAU 110 via RF Receiving Antenna 112.

The RRAU 110 is a portable, battery powered Remote Receiving/Alert Unit that notifies the user that the Appliance Being Monitored 10 has completed its cycle. An example would be a washing machine or a clothes dryer that has completed its laundry cycle. A detailed description of the RRAU 110 components and its operation follows. As stated previously, the end-of-cycle RF Data Transmission from AMTU 20 is received by RF Receiver Antenna 112 and is sent to RF Receiver 114. Its digital output goes to Data Decoder 116. Data Decoder 116 also has an input from Appliance Address Selector 121. Appliance Address Selector 121 is used to set the RRAU 110 digital address to match the digital address selected by the user on the AMTU 20 described above, so as to create a system communication pair. Data Decoder 116 compares the data contained in the transmission sent from the AMTU 20 (and received by RF Receiver 114) with the user selected address generated by Appliance Address Selector 121. If Data Decoder 116 determines that the RF data signal matches the selected address, then it provides alert outputs as discussed below. If the appliance address contained in the incoming RF data signal does not match the selected user address of Appliance Address Selector 121, the RRAU 110 will not output any form of alert to the user. In this embodiment, Data Decoder 116 has two alert outputs. One output goes to Visual Alert Timer or Latch 124 which has an output that goes to LED Driver 130 and turns on Appliance Visual Alert LED 136. The second output of the Data Decoder 116 goes to the Audio Alert Timer 128, whose output goes to Audio Driver 134 and turns on Appliance Audio Alert Transducer 140. The Appliance Visual Alert LED will be latched or activated for a duration determined by the Visual Alert Timer or Latch 124. The Appliance Audio Alert Transducer 140 will be activated for a duration determined by Audio Alert Timer 128, unless it is turned off by the user using Appliance Audio Alert On/Off Switch 148.

The RRAU 110 is a portable module that is powered by DC Battery 120, which supplies battery voltage "Vbar" to all of its components. An AC to DC Wall Adapter 142 can be plugged into the RRAU 110 using Power Plug 144 inserted into Power Receptacle 146. Wall Adapter 142 can also be a 120 VAC to DC docking station and Power Connectors 144 and 146 would be any type of mating power connectors.

Figure 2:
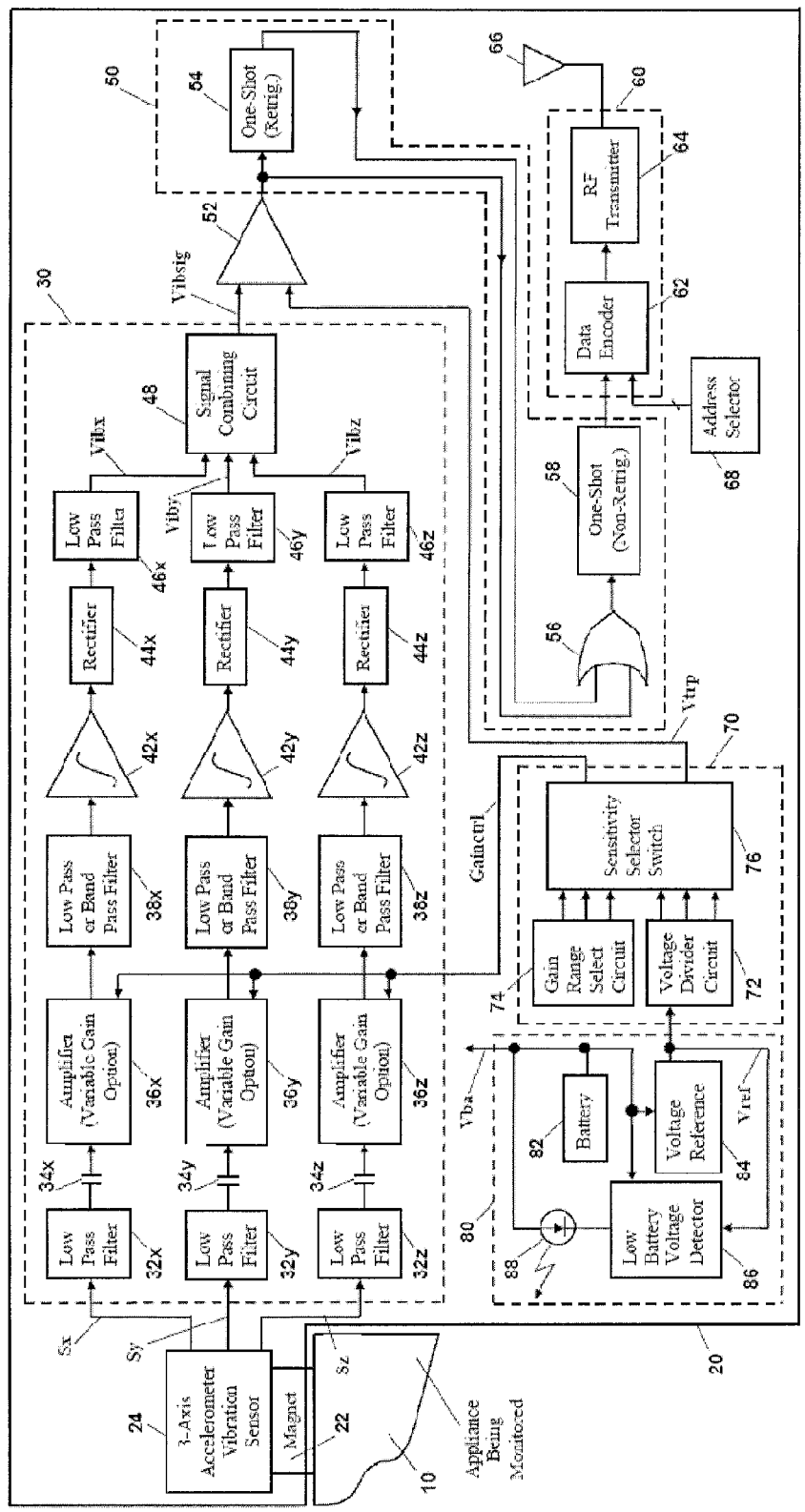
FIG. 2 illustrates a block diagram of an exemplary embodiment of a monitor and transmitter unit according to the teachings of the present invention.

FIG. 2 is a block diagram of the electrical schematic drawing of the electronic system included in the Appliance Monitor and Transmitter Unit 20 (AMTU 20) of one embodiment of the invention, and shows the internal electronic components of AMTU 20. In all the embodiments that will be discussed hereinafter, AMTU 20 is a small, portable, self-contained unit that is powered by Battery 82 and does not need to be plugged into any 120 VAC or 220 VAC outlet. However, this does not preclude a version of the AMTU powered by a 120 VAC or 220 VAC power source. In this embodiment, the self-contained AMTU 20 includes Attachment Apparatus 22, which in this case is a magnet, appliance Vibration Sensor 24, Signal Conditioning Circuitry 30, Comparator 52, Logic Circuitry Subsystem 50, Battery Voltage Subsystem 80, Sensitivity Selection Circuitry 70, Address Selector 68, Data Encoder 62, RF (Radio Frequency) Transmitter 64, and Antenna 66. Antenna 66 can either be a short wire antenna extending from AMTU 20 or an antenna that is an integral part of the PC (Printed Circuit) board used for the electronics of AMTU 20. AMTU 20 is attached by the user to any metallic (ferro-magnetic material) location on the Appliance Being Monitored 10 (using the magnetic force from Magnet 22). In this embodiment, appliance Vibration Sensor 24 is a small, 3-axis accelerometer, preferably surface mounted to the electronics' PC board. The raw signal outputs (Sx, Sy, Sz) of 3-Axis Accelerometer Vibration Sensor 24 are directly related to the movement (or more correctly, the mathematical first derivative of the movement (i.e., the acceleration)) of the Appliance Being Monitored 10. For the purposes of this discussion, we will only be describing the x-axis signal path, however, the y-axis and z-axis have signal paths that are identical, with the identical components for each path being labeled x, y, or z respectively. Signal Sx is first sent to Low Pass Filter 32x and then through DC (direct current) blocking Capacitor 34x to signal conditioning Amplifier 36x. We are interested in the alternating current (AC) portion of the acceleration sensor signals (Sx, Sy, Sz) because the AC signals are an indication of the movement of the Appliance Being Monitored 10. The DC portion of most new accelerometers is an indication of the earth's gravitational acceleration, and is often used for measurements of angle. In this embodiment, Amplifiers 36x, 36y, and 36z are variable gain amplifiers, with the gain being controlled by the "Gainctrl" signal from Sensitivity Selector Switch 76, so as to provide the optimum gain for the particular Appliance Being Monitored 10. The amplified signal from Amplifier 36x is sent to Low Pass or Band Pass Filter 38x, which consists of a first (or higher) order low pass filter or a first (or higher) order band pass filter. The break points of this filter are determined empirically and are optimized for the appliances being monitored, so as to eliminate as much unwanted high frequency mechanical and electrical noise as possible. In this embodiment, the AC output signal of Low Pass or Band Pass Filter 38x is sent to Mathematical Integrator Circuit 42x. Mathematically integrating the acceleration signal from accelerometer Vibration Sensor 24 provides the true velocity signal of the mechanical vibration of the Appliance Being Monitored 10. It also eliminates the high frequency bias added by an accelerometer vibration sensor, so as to eliminate even more unwanted high frequency mechanical and electrical noise. This is explained in greater detail in the following description. During its operation, the Appliance Being Monitored 10 often vibrates at several velocities (each of which is defined in units of displacement per unit of time) at different AC frequencies: $f_1$, $f_2$, $f_3$, etc. We will concentrate on just the most prominent sinusoidal vibration velocity and call it $Vib_1$:

$$Vib_1 = B_1 * \cos(2*\pi*f_1*t),$$

where $B_1$=Maximum amplitude of $Vib_1$ at frequency $f_1$; $f_1$=frequency of $Vib_1$; t=time. The output of accelerometer Vibration Sensor 24 is the first derivative of this vibration with respect to time, t, where:

$$\text{Accelerometer output}: S_1 = Acc_1 = d(Vib_1)/dt = -2*\pi*f_1*B_1*\sin(2*\pi*f_1*t)$$

As can be seen from this equation, the absolute value of the maximum amplitude of an accelerometer output in general at any frequency, f, is $|-2*\pi*f*B|$ and, thus, includes a frequency, f, multiplier term. Therefore, the accelerometer's output increases as frequency, f, increases for a given amplitude of velocity. Many slight mechanical noise vibrations occur at higher frequencies. Hence, an accelerometer will accentuate these noise vibrations and create a false indication of operation of an appliance or machine being monitored. In this embodiment of the invention, AMTU 20 includes Mathematical Integrators 42x, 42y, and 42z. They perform integration of sinusoidal signals from the accelerometer. An integrated sinusoidal signal includes a "(1/frequency)" term and thus cancels out the frequency, f, term in the accelerometer output equation shown above. Hence the mathematical integrators act as a noise reduction technique.

The output of Mathematical Integrator Circuit 42x is sent to Rectifier 44x. In this embodiment, Rectifiers 44x, 44y, and 44z are full-wave precision rectifiers, but less precise half-wave rectifiers could be used. The output of Rectifier 44x goes to very low frequency Low Pass Filter 46x (with a breakpoint frequency of less than 0.5 Hz) to remove as much AC ripple as possible from the full-wave rectified vibration signal. Thus, the output of Low Pass Filter 46x (Vibx) is a slowly moving DC voltage whose amplitude is directly related to the amplitude of the vibration (movement) in the x-axis of the Appliance Being Monitored 10. Similarly, the output amplitudes of Low Pass Filter 46y (Viby) and Low Pass Filter 46z (Vibz) are directly related to the amplitudes of the vibration (movement) in the y-axis and z-axis, respectively, of the Appliance Being Monitored 10. These signals (Vibx, Viby, and Vibz) are now combined in Signal Combining Circuit 48 to yield a combined vibration signal output called "Vibsig." In one embodiment of the invention, Signal Combining Circuit 48 is a simple summing circuit where:

$$Vibsig = K_1 * [(Vibx) + (Viby) + (Vibz)]$$

$K_1$ is a constant which is empirically derived such that the output of Signal Combining Circuit 48 does not saturate for reasonable values of Vibx, Viby, and Vibz. In a second embodiment of the invention, Signal Combining Circuit 48 derives the output "Vibsig" according to the following equation (often called the "square root of the sum of the squares" equation):

$$Vibsig = K_2 \sqrt{[(Vibx)^2 + (Viby)^2 + (Vibz)^2]}$$

$K_2$, like $K_1$, is a constant which is empirically derived such that "Vibsig" does not saturate for reasonable values of Vibx, Viby, and Vibz.

However it is derived by Signal Combining Circuit 48, "Vibsig" is sent to the positive input of Comparator 52. The purpose of Comparator 52 is to trip high when the amplitude of the appliance's vibration is above some predetermined value, which means the appliance is still in operation. Comparator 52 has a small amount of hysteresis, produced by using a small amount of positive feedback around the comparator, to reduce false triggering. The negative input of Comparator 52 is connected to "trip-point" reference voltage "Vtrp," which is created in the following manner. Several precision reference voltages are first created from precision Voltage Reference 84 using resistive Voltage Divider Circuit 72. In this embodiment there are three reference voltages created by Voltage Divider Circuit 72: a "sensitive vibration" reference voltage, a "normal vibration" reference voltage, and a "high vibration" reference voltage. One of these reference voltages is selected by the operator using Sensitivity Selector Switch 76 to become the "trip-point" reference voltage "Vtrp" sent to Comparator 52. In other embodiments, there could easily be fewer or larger numbers of reference voltages created by modifying resistive Voltage Divider Circuit 72, if desired. Sensitivity Selector Switch 76 would then need fewer or larger numbers of selector positions accordingly. The determination of the various values to be used for these "trip-point" reference voltages is done by empirically testing many appliances for typical operating vibrations using Vibration Sensor 24 in order to provide "vibration profiles" for each of the appliances. Thus, the invention will be optimized for a wide range of appliances being monitored, each having different levels of vibration and noise generated during their normal operation.

A discussion of the importance of Sensitivity Selector Switch 76 is in order. There are many new washers and dryers specifically being marketed as "quiet" appliances, which produce very little vibration. For such state of the art appliances, a "very sensitive" "trip-point" voltage (i.e., "Vtrp" equals some small voltage) would be required for AMTU 20 to detect the very small amplitude vibrations produced by these devices. This can be considered case 1. It should be noted, however, that such a "very sensitive" "trip-point" will also make AMTU 20 more sensitive to extraneous mechanical "noise," and therefore should only be used when the Appliance Being Monitored 10 truly needs such sensitivity. For many older washers, dryers, or other appliances already out in the marketplace, a larger amount of vibration is produced than the "quiet" appliances in normal operation. Therefore, a higher "trip-point" voltage (i.e., "Vtrp" equals some higher voltage) would allow for more movement before tripping Comparator 52, so as to reduce false triggering due to extraneous mechanical movements produced by bumping the appliance or from other sources of extraneous mechanical "noise." This could be called a "medium sensitivity" "trip-point" voltage for AMTU 20, and can be considered case 2. And finally, for washers and dryers that may be placed on weak flooring, a larger amount of vibration may be produced than either case 1 or case 2 appliances during normal operation. This is due to the large movement created by the flooring, when the appliance is in operation. In this case 3, a higher "low sensitivity" "trip-point" voltage than was used in case 2 would allow for even more movement before tripping Comparator 52, so as to reduce false triggering due to extraneous mechanical movements. Thus, it can be seen that Sensitivity Selector Switch 76 is used to help AMTU 20 more closely and effectively monitor the vibration of the particular Appliance Being Monitored 10 to which it is attached. It helps AMTU 20 determine when the specific appliance it is monitoring is in its normal operation or is off, while reducing false triggerings of these conditions. Therefore, not only can it effectively change the vibration sensitivity of AMTU 20, it can also be considered a mechanical "noise" reduction technique (or a technique to reduce false triggerings) for AMTU 20.

In this embodiment, Sensitivity Selector Switch 76 is a double-pole triple-throw type switch. Thus far we have discussed the first pole of this switch. The input of the second pole of this switch is derived from Gain Range Select Circuit 74. By changing the Sensitivity Selector Switch 76, the appropriate gain of Amplifier 36x, Amplifier 36y, and Amplifier 36z will be selected. The output of Comparator 52 is sent to a Retriggerable One-Shot 54 and to one input of OR Gate 56. The output of Retriggerable One-Shot 54 goes to the second input of OR Gate 56. Retriggerable One-Shot 54 is negative-edge triggered. When the vibration drops below trip point "Vtrp" for brief periods of time, Retriggerable One-Shot 54 is triggered and the output of OR Gate 56 remains high. This is to alleviate the problem of short duration dropouts in the vibration of the Appliance Being Monitored 10. Once the vibration has dropped below the trip point "Vtrp" permanently, due to the appliance reaching its end-of-cycle, One-Shot 54 will re-trigger for a fixed duration without any further re-triggering. This last trigger event of One-Shot 54 will finish at a logic level zero and cause Or Gate 56 to drop to a logic level zero, which will trigger One-Shot 58, which is a negative edge triggered One-Shot. The purpose of the output of One-Shot 58 is to turn on RF Transmitter 64 through Data Encoder 62 only once at the end-of-cycle of the Appliance Being Monitored 10. One-Shot 58 is thus a non-retriggerable one-shot. The Data Encoder adds a preselected appliance Identification Address from Address Selector 68 to the End-of-Cycle Alert Code. In this embodiment, Address Selector 68 provides an eight-bit address code, which means the user can select one of 256 unique address codes. The End-Of-Cycle Alert Code can be as simple as 1 bit of data or can be more complex. The RF Transmitter 64 sends its RF signal through Antenna 66 to the RF Receiver/Alert Unit 110 of FIG. 1. For clarity, it should be noted that Data Encoder/RF Transmitter 60 depicted in FIG. 1 is the combination of Data Encoder 62 and RF Transmitter 64.

Finally, Battery Voltage Subsystem 80, consists of Battery 82, Voltage Reference 84, Low Battery Voltage Detector 86, and Low Battery Voltage LED 88. Battery 82 provides voltage "Vba" to all the electronic components of AMTU 20. It also supplies voltage to Voltage Reference 84, which creates very stable Reference Voltage "Vref". Low Battery Voltage Detector 86 monitors Battery Voltage "Vba" and uses "Vref" to determine when the battery voltage is low. If the battery voltage is low, it turns on Low Battery Voltage LED 88 to provide visual indication of the low battery condition.

It is important to note the unique method of sensing vibration of an appliance or machine (being monitored) detailed in this embodiment of the invention, namely using a 3-Axis Accelerometer as Vibration Sensor 24. Using a 3-Axis Accelerometer for Vibration Sensor 24 is superior in detection of vibration for this application for several reasons. A single-axis Vibration Sensor 24, (i.e., either a single-axis accelerometer or a single-axis velocity sensor) may not optimally monitor an appliance's vibration, because the vibration may predominately occur in either of the two axes not monitored. Most readily available velocity sensors are of the single-axis variety. To help alleviate this problem, using a two-axis accelerometer for Vibration Sensor 24 is better than a single-axis version, but again, such a sensor may not optimally monitor an appliance's vibration, because the vibration may predominately occur in the third axis not monitored, which is even more likely to occur with the new "quiet" appliances. By using a 3-Axis Accelerometer, it does not matter at which angle AMTU 20 is attached to the Appliance Being Monitored 10, since all axes are being monitored. By summing the signals (or otherwise mathematically combining the signals, as described above) from all three axes, the best method of monitoring an appliance's or a machine's vibration profile or vibration characteristics (no matter in which axis they predominately occur) can be achieved by AMTU 20 for optimum vibration detection.

Figure 3:
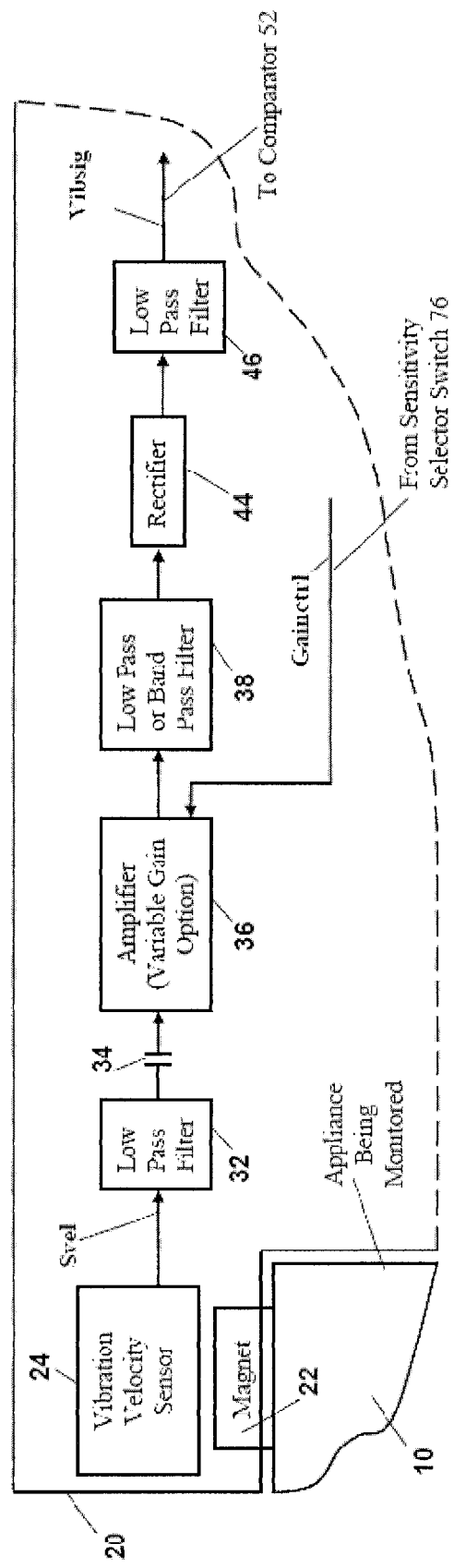
FIG. 3 illustrates a partial view of a block diagram of another exemplary embodiment of a monitor and transmitter unit according to the teachings of the present invention.

FIG. 3 is a block diagram of the electrical schematic drawing of the electronic system included in the Appliance Monitor and Transmitter Unit 20 (AMTU 20) of another embodiment of the invention in which the Vibration Sensor 24 is a single axis velocity sensor. Note that this vibration sensor is not an accelerometer, but its output is the vibration velocity of the Appliance Being Monitored 10, i.e., the first derivative of displacement, or d(displacement)/dt. The output of vibration velocity sensor 24 is "Svel" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select Circuit 74, as given in the description for FIG. 2. The output of Amplifier 36 is sent through a Low Pass or Band Pass Filter 38. The gain ranges of Amplifier 36 and the frequency breakpoints of Filter 38 are optimized for the signal output of Vibration Velocity Sensor 24. Note, that because the output of Vibration Velocity Sensor 24 in this embodiment is already a velocity signal, no mathematical integration is required as may be used in the embodiment shown in FIG. 2, which uses an accelerometer. Rectifier 44 and Low Pass filter 46 both act exactly as those described in FIG. 2. The output "Vibsig" of Low Pass filter 46 goes to the positive input of Comparator 52. All of the remaining circuitry of the AMTU 20 for this embodiment of the invention, which is not shown in FIG. 3, acts exactly as detailed in the description of the embodiment of FIG. 2.

Figure 4:
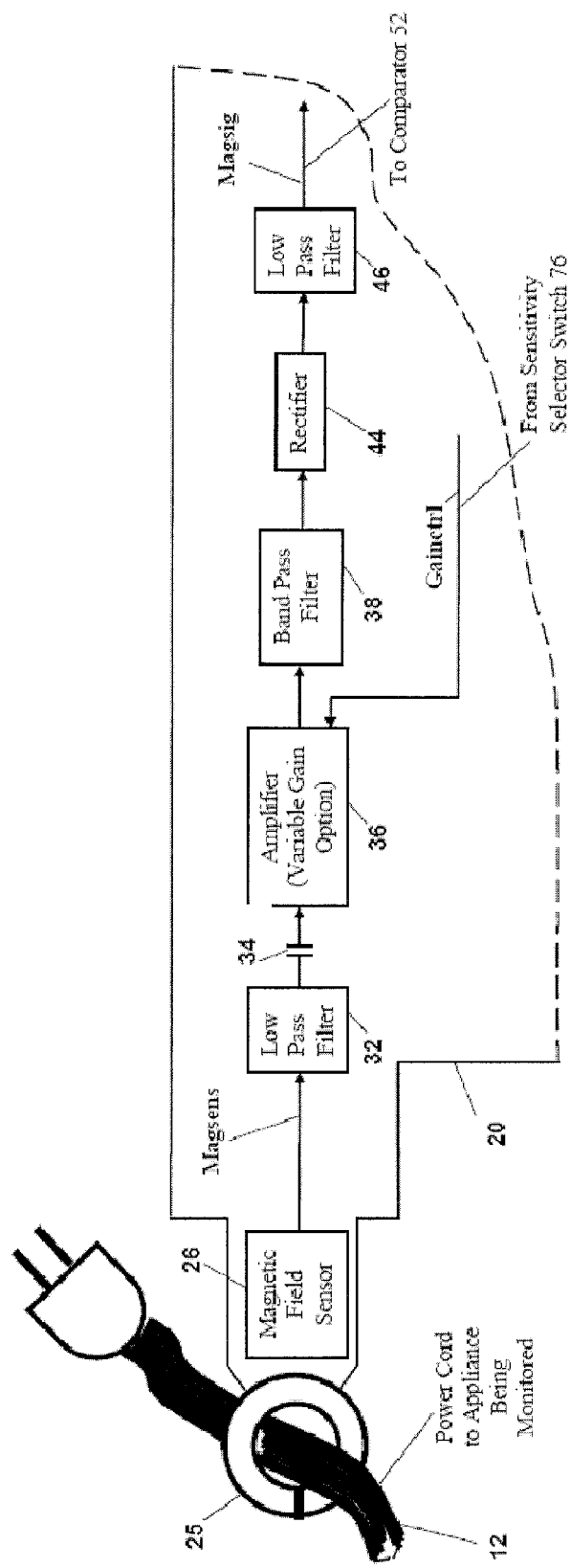
FIG. 4 illustrates a partial view of a block diagram of another exemplary embodiment of a monitor and transmitter unit according to the teachings of the present invention.

FIG. 4 is a block diagram of the electrical schematic drawing of the electronic system included in the Appliance Monitor and Transmitter Unit 20 (AMTU 20) of another embodiment of the invention. This embodiment the operation cycle sensor comprises a Magnetic Field Sensor 26 instead of a vibration sensor to determine when the Appliance Being Monitored 10 is in operation. It does so by measuring the amplitude of the magnetic field surrounding Power Cord 12, which is directly related to the amplitude of the electrical current being drawn by the Appliance Being Monitored 10 through Power Cord 12. Magnetic Field Sensing Ring 25 is an electrically isolated ring that surrounds Power Cord 12 and concentrates the magnetic field of the power cord for Magnetic Field Sensor 26. Magnetic Field Sensing Ring 25 can be a clamp-on type ring that can be attached by any user. Such a clamp on type of ring requires no wiring or electrical connection to the power source of the Appliance Being Monitored 10, and, thus, maintains a high degree of safety for any user of this monitoring system. Magnetic Field Sensor 26 could either be a Hall-Effect Sensor or an inductive coil similar to a telephone pickup coil. The output of Magnetic Field Sensor 26 is "Magsens" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select circuit 74 as detailed in the description for FIG. 2. The output of Amplifier 36 is sent through Band Pass Filter 38, which is centered around 60 Hz and is the frequency of the power applied to the Appliance Being Monitored 10. The gain ranges of Amplifier 36 are optimized for the Magnetic Field Sensor's signal. Rectifier 44 and Low Pass filter 46 both act exactly as those shown in FIG. 2. The output "Magsig", of Low Pass filter 46 goes to the positive input of Comparator 52. All of the remaining circuitry of the AMTU 20 for this embodiment of the invention, which is not shown in FIG. 4, acts exactly as detailed in the description of the embodiment of FIG. 2.

Figure 5:
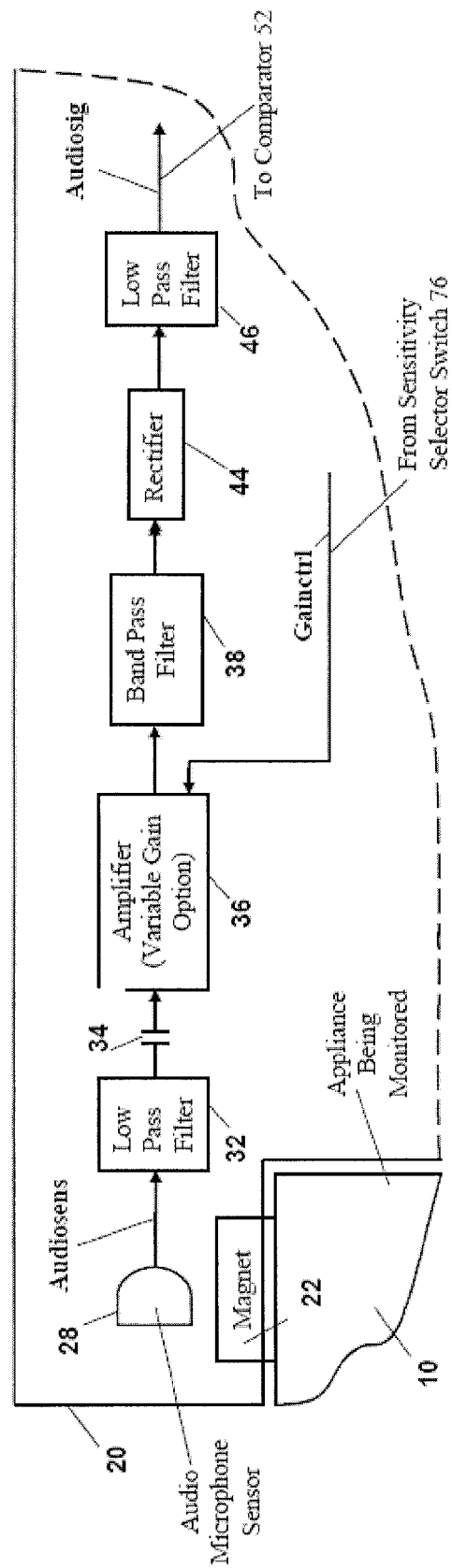
FIG. 5 illustrates a partial view of a block diagram of another exemplary embodiment of a monitor and transmitter unit according to the teachings of the present invention.

FIG. 5 is a block diagram of the electrical schematic drawing of the electronic system included in the Appliance Monitor and Transmitter Unit 20 (AMTU 20) in another embodiment of the invention which uses an Audio Microphone Sensor 28, instead of a vibration sensor, as an operation cycle sensor. Audio Microphone Sensor 28 is used to monitor noises associated with the operation of the Appliance Being Monitored 10, either transmitted through the air or mechanically coupled through the appliance's chassis. It also can monitor end-of-cycle audio alerts provided by the appliance. The output of Audio Microphone Sensor 28 is "Audiosens" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select circuit 74 as detailed in the description for FIG. 2. The output of Amplifier 36 is sent through Band Pass Filter 38. The gain ranges of Amplifier 36 and the frequency breakpoints of Band Pass Filter 38 are optimized for the Audio Microphone's signal output. Rectifier 44 and Low Pass Filter 46 both act exactly as those shown in FIG. 2. The output "Audiosig", of Low Pass Filter 46 goes to the positive input of Comparator 52. All of the remaining circuitry of the AMTU 20 for this embodiment of the invention, which is not shown in FIG. 5, acts exactly as detailed in the description of the embodiment of FIG. 2.

Figure 6:
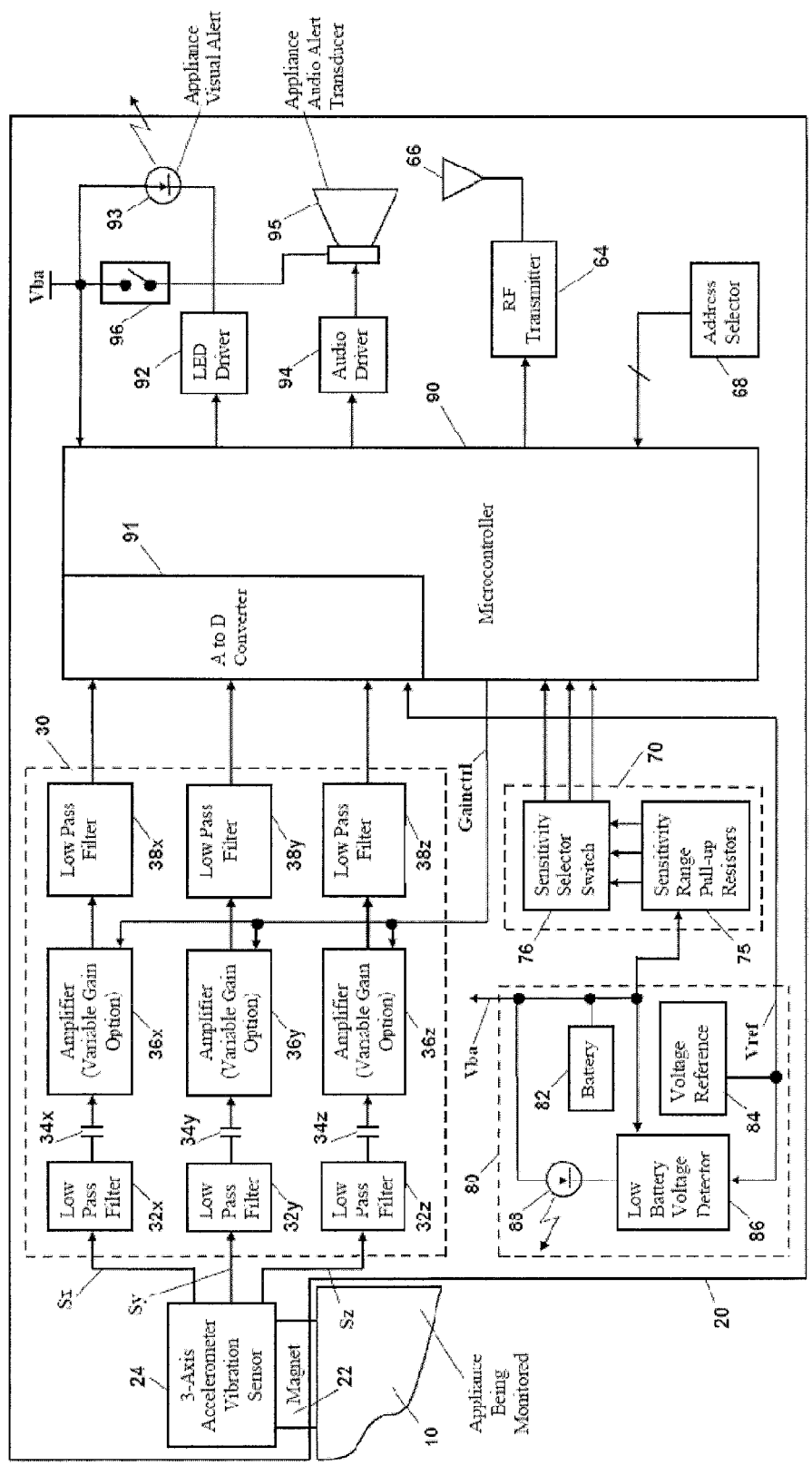
FIG. 6 illustrates a block diagram of another exemplary embodiment of a monitor and transmitter unit according to the teachings of the present invention.

FIG. 6 is a block diagram of the electrical schematic drawing of the electronic system included in the Appliance Monitor and Transmitter Unit 20 (AMTU 20) of another embodiment of the invention. This embodiment shows an AMTU 20 which utilizes a microcontroller to replace much of the electronic circuitry described in the embodiment of FIG. 2. In this embodiment, the self-contained AMTU 20 includes Attachment Apparatus 22 (which is a magnet in this embodiment), Appliance Vibration Sensor 24, Signal Conditioning Circuitry 30, Sensitivity Selection Circuitry 70, Battery Voltage Subsystem 80, Address Selector 68, Microcontroller 90, the visual and audio alert electronics described below, RF (Radio Frequency) Transmitter 64, and Antenna 66. Antenna 66 can be implemented as is detailed in the discussion of FIG. 2. AMTU 20 is attached by the user to any metallic (ferromagnetic material) location on the Appliance Being Monitored 10 (using the magnetic force from Magnet 22). In this embodiment, Appliance Vibration Sensor 24 is a small, 3-axis accelerometer, such as that previously used in the embodiment shown in FIG. 2, preferably surface mounted to the electronics' PC board. As in the embodiment shown in FIG. 2, the raw signal outputs (Sx, Sy, Sz) of 3-Axis Accelerometer Vibration Sensor 24 are directly related to the movement (or more correctly, the mathematical first derivative of the movement (i.e., the acceleration)) of the Appliance Being Monitored 10. For the purposes of this discussion, we will only be describing the x-axis signal path. However, the y-axis and z-axis have signal paths that are identical, with the identical components for each path being labeled x, y, or z respectively. Signal Sx is first sent to Low Pass Filter 32x and then through DC (direct current) Blocking Capacitor 34x to signal conditioning Amplifier 36x. As previously stated in the FIG. 2 discussion, we are only interested in the alternating current (AC) portion of the acceleration sensor signals (Sx, Sy, Sz) because the AC signals are an indication of the movement of the Appliance Being Monitored 10. In this embodiment, Amplifier 36x is a variable gain amplifier, with the gain being controlled by the "Gainctrl" signal, which is an output from Microcontroller 90. The amplified signal from Amplifier 36x is sent to Low Pass Filter 38x, which consists of a first (or higher) order low pass filter. Low Pass Filter 38x is an anti-aliasing low pass filter for A to D Converter 91 of Microcontroller 90. A to D Converter 91 rapidly digitizes the analog signal from Low Pass Filter 38x and the A to D results are stored in Microcontroller 90. Microcontroller 90 contains RAM, ROM, and a CPU, and performs a software algorithm. In this embodiment, the software algorithm of Microcontroller 90 performs the operations of Integrator 42x, Rectifier 44x, and Low Pass Filter 48x detailed in the description of FIG. 2. The discussions for the y-axis and z-axis signal paths, functional circuit blocks, and associated software are essentially identical to those just described for the x-axis. In this embodiment, signals Vibx, Viby, and Vibz are created internally in Microcontroller 90. The software of Microcontroller 90 performs the mathematical operation of the Signal Combining Circuit 48 shown in FIG. 2. It either performs the simple summing equation or the more complex "square root of the sum of the squares" equation for Vibx, Viby, and Vibz, described in great detail in the discussion of FIG. 2, and produces the signal "Vibsig". As with the embodiment of FIG. 2, AMTU 20 is powered by Battery Voltage Subsystem 80. It provides battery Voltage "Vba" to all of the components contained in the AMTU 20, has a Low Battery Voltage Detector 86 and Low Battery Voltage Detector LED 88, and Precision Voltage Reference 84, which provides "Vref" as an input to A to D Converter 91. Microcontroller 90 uses the "Vref" input to create several precision reference voltages. In this case, it performs the function of the resistive Voltage Divider Circuit 72 of FIG. 2. In this embodiment there are three reference voltages created internally from "Vref" by Microcontroller 90: a "sensitive vibration" reference voltage, a "normal vibration" reference voltage, and a "high vibration" reference voltage. One of these reference voltages is selected by the operator using Sensitivity Selector Switch 76, whose operation is described below, to become the "trip-point" reference voltage "Vtrp". In this embodiment of the invention, three digital signal inputs are created by three Sensitivity Range Pull-up Resistors 75 connected to three digital inputs of Microcontroller 90. These inputs are also connected to the three positions of single pole, triple throw Sensitivity Selector Switch 76, whose center pole is grounded. By selecting one of the three positions of the switch, one of the Microcontroller 90 signal inputs is grounded, and a Sensitivity Range is selected. This not only selects the value of "Vtrp", but also one of the three "Gainctrl" signals sent to Amplifiers 36x, 36y, and 36z. Microcontroller 90 performs the function of Gain Range Select Circuit 74 shown in FIG. 2 to create these three gain control signals. Microcontroller 90 also performs the function of Comparator 52 shown in FIG. 2, which is to trip high when the amplitude of the appliance's vibration is above the selected predetermined value "Vtrp" (and means the appliance is still in operation). A small amount of hysteresis is added to this pseudo comparator trip point by the software of Microcontroller 90. In addition, Microcontroller 90 performs the functions of One-Shot 54, Or Gate 56, and One-Shot 58 (Logic Circuitry Subsystem 50), whose operations are discussed in the description of FIG. 2. The software of Microcontroller 90 emulates the decision making operation of Comparator 52 and Logic Circuitry Subsystem 50 (detailed in the discussion of FIG. 2). It will turn on RF Transmitter 64 to transmit an RF Data Signal through RF Antenna 66 only when the Appliance Being Monitored 10 has reached its end-of-cycle. Address Selector 68 allows the user to select a unique digital identification code for the Appliance Being Monitored 10 to be used as part of the RF Transmission. In this embodiment, it provides an eight-bit digital input signal to Microcontroller 90, which performs the function of Data Encoder 62 of FIG. 2, and adds this address to the AMTU's RF Transmission. Also, in this embodiment of the invention, local visual and audio alerts have been added to AMTU 20 itself, as shown in FIG. 6. When the Appliance Being Monitored 10 has reached its end-of-cycle and the AMTU 20 sends an RF Transmission, Microcontroller 90 does the following. First, it performs the function of a Visual Alert Timer or Latch (similar to the Visual Alert Timer or Latch 124 of RRAU 110 shown in FIG. 1) and sends an output signal to LED Driver 92 that turns on Appliance Visual Alert LED 93 on the outside of AMTU 20. Secondly, it performs the function of an Audio Alert Timer (similar to the Audio Alert Timer 128 of RRAU 110 shown in FIG. 1) and sends an output signal to Audio Driver 94 that turns on Appliance Audio Alert Transducer 95 contained within AMTU 20. The Appliance Visual Alert LED 93 will be latched or activated for a duration pre-determined by the software of Microcontroller 90. Similarly, the Appliance Audio Alert Transducer 95 will be activated for a duration pre-determined by the software of Microcontroller 90, unless it is turned off by the user using Appliance Audio Alert On/Off Switch 96.

Figure 7:
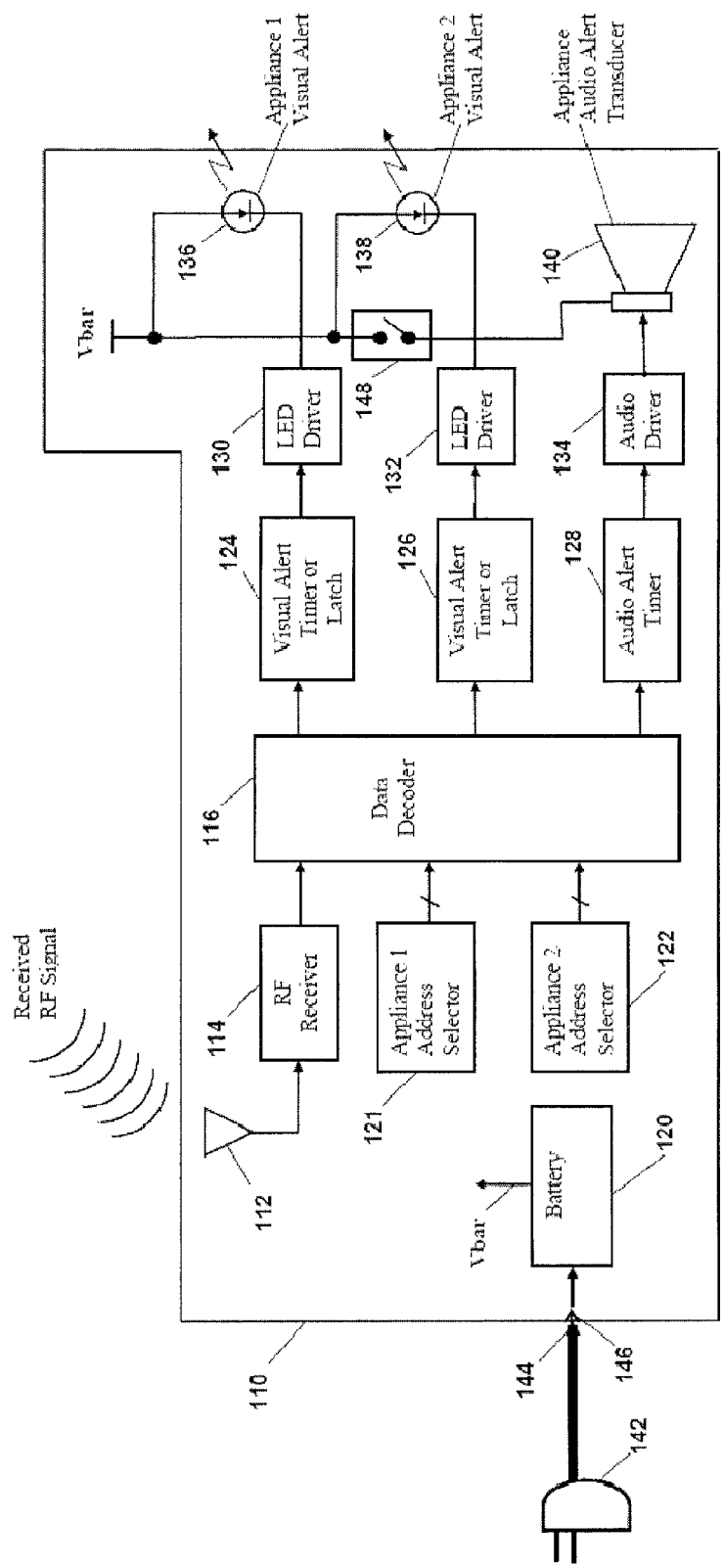
FIG. 7 illustrates a block diagram of an exemplary embodiment of a receiver and alert unit according to the teachings of the present invention.

FIG. 7 is another embodiment of RRAU 110. The difference between the RRAU 110 shown in FIG. 7 and the RRAU 110 shown in FIG. 1, is that additional circuitry has been added to the RRAU 110 in FIG. 7 to support monitoring and alert for a second appliance. To this end, Appliance 2 Address Selector 122 has been added as an input to Data Decoder 116. The visual alert for a second appliance is accomplished by a second visual alert subsystem composed of Visual Alert Timer or Latch 126, LED Driver 132 and Appliance 2 Visual Alert LED 138. The Appliance Audio Alert Transducer 140 and its associated circuitry, Audio Alert Timer 128 and Audio Driver 134, are common to the alerts for Appliance 1 and Appliance 2. Appliance Address Selector 121 and Appliance Address Selector 122 give the user the ability to monitor two different AMTU's, each with its own unique address, using the single RRAU 110 shown in FIG. 7. An example of this would be a user of the invention utilizing a single RRAU 110 to monitor both a washing machine and a dryer.

Figure 8:
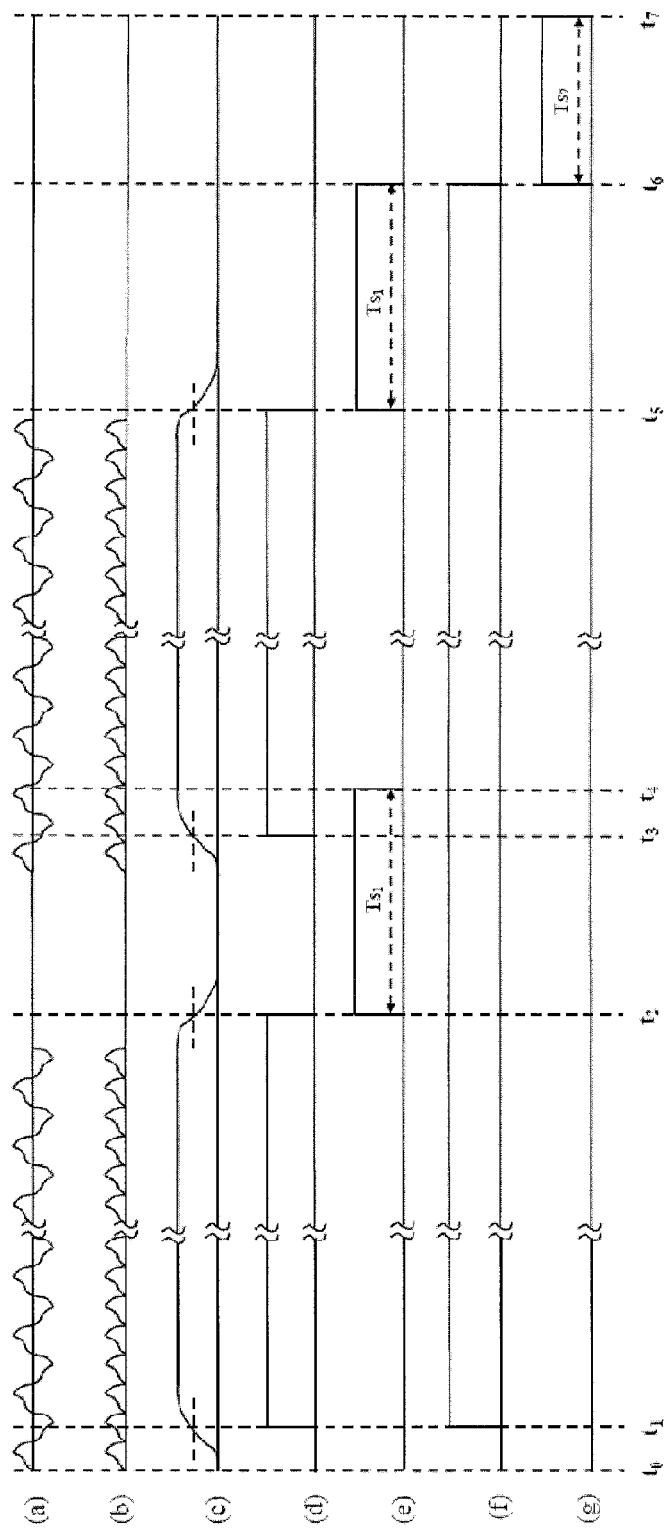
FIG. 8 illustrates a graph depicting the generation and transformation of signals by an exemplary embodiment of a monitor and transmission unit according to the teachings of the present invention.

FIG. 8 is a depiction of the various oscillograms of the signals and timing diagrams for an embodiment of the invention described in FIG. 2. Referring to FIG. 2 and its description will aid in understanding the following description of these oscillograms. First, FIG. 8($a$) illustrates the x-axis signal output of Mathematical Integrator 42x, which is the signal conditioned x-axis output of the 3-Axis Accelerometer Vibration Sensor 24 shown in FIG. 2. It should be noted that this could also be the output signals of Mathematical Integrator 42y or Mathematical Integrator 42z, because they are very similar to the x-axis signal shown. The vibration signal shown in FIG. 8($a$) starts at time $t_0$, which is when the Appliance Being Monitored 10 begins its operation. FIG. 8($b$) illustrates the output of Rectifier 44x (or, similarly, Rectifier 44y or Rectifier 44z), which in this case, is a full wave rectifier. FIG. 8($c$) illustrates the output "Vibsig" of Signal Combining Circuit 48, which is the mathematical combination of "Vibx," the output of Low Pass Filter 46x, "Viby," the output of Low Pass Filter 46y, and "Vibz," the output of Low Pass Filter 46z. Signal Combining Circuit 48 performs this mathematical combination using one of two equations, as previously explained in the discussion of FIG. 2. "Vibsig" is sent to the positive input of Comparator 52. FIG. 8($d$) illustrates the output of Comparator 52. When "Vibsig," exceeds "Vtrp," which is the negative input of Comparator 52, the output of Comparator 52 goes high at time $t_1$, as shown. The output of Comparator 52 goes to two places: to the input of Retriggerable One-Shot 54 and to one input of OR Gate 56. The output of Retriggerable One-Shot 54 goes to the second input of OR Gate 56. FIG. 8($e$) illustrates the output of Retriggerable One-Shot 54 and FIG. 8($f$) illustrates the output of OR Gate 56. As can be seen in FIG. 8($f$), the output of OR Gate 56 also goes high at time $t_1$, while the output of One Shot 54 remains low, as shown in FIG. 8($e$). As long as the Appliance Being Monitored 10 continues to operate, the amplitude of FIG. 8($c$) remains above "Vtrp," and the output of Comparator 52 remains high, as shown in FIG. 8($d$). If for any reason, such as the temporary interruption of the rotational cycle of the Appliance Being Monitored 10, "Vibsig" drops below "Vtrp," and the output of Comparator 52 drops low at time $t_2$. Retriggerable One-Shot 54 is negative-edge triggered. When the output of Comparator 52 drops low at time $t_2$, One-Shot 54 is triggered high for time period $Ts_1$, and the output of OR Gate 56 remains high. This is to alleviate the problem of short duration drop-outs in the vibration of the Appliance Being Monitored 10. The time period $Ts_1$, which is the output pulse time of One-Shot 54, is selected to be longer than any of these expected temporary short duration drop-outs in vibration. When the Appliance Being Monitored 10 begins its operation again, vibration signals begin again (FIG. 8($a$)). The amplitude of "Vibsig" once again increases (FIG. 8($c$)), and it exceeds trip point "Vtrp" so that the output of Comparator 52 goes high at time $t_3$, as shown in FIG. 8($d$). When One Shot 54 times out, its output goes low at time $t_4$ (FIG. 8($e$)), but the output of OR Gate 56 remains high (FIG. 8($f$)). The Appliance Being Monitored 10 operates for some further time until it reaches its end-of-cycle, and its vibration permanently stops. The amplitude of "Vibsig" once again decreases (FIG. 8($c$)), and it drops below trip point "Vtrp" so that the output of Comparator 52 goes low at time $t_5$, for the last time as shown in FIG. 8(d). One-Shot 54 will re-trigger for fixed duration $Ts_1$ without any further re-triggering. When it times out at time $t_6$, the output of One-Shot 54 will finish at a logic level zero and cause Or Gate 56 to drop to a logic level zero (FIG. 8(f)), which will trigger One-Shot 58, since it is also a negative-edge triggered one-shot. The purpose of the output of One-Shot 58, shown in FIG. 8(g), is to turn on RF Transmitter 64 through Data Encoder 62 only once at the end-of-cycle of the Appliance Being Monitored 10. One-Shot 58 is thus a non-retriggerable one-shot and stays high for time period $Ts_2$. During this time, RF Transmitter 64 is transmitting the End-of-Cycle Alert Code and Address Code information. When One-Shot 58 times out at time $t_7$, the RF transmission ceases and AMTU 20 is ready to monitor another complete operation of the Appliance Being Monitored 10.

A discussion of several alternative methods to be used as the Attachment Apparatus 22 is in order. As previously stated, Attachment Apparatus 22 is used to attach AMTU 20 to the Appliance Being Monitored 10. In all the previously discussed embodiments, a magnet has been used as the Attachment Apparatus 22. In one alternate embodiment, the Attachment Apparatus 22 is a Mechanical Bracket, which is attached to, or an integral part of, AMTU 20. This Mechanical Bracket would then be bolted into a mounting hole that is readily accessible (such as on a faceplate) on Appliance Being Monitored 10, to solidly mount AMTU 20 to the appliance. In another alternate embodiment, AMTU 20 can be mounted anywhere (including non-metallic locations) on the Appliance Being Monitored 10 by making Attachment Apparatus 22 consist of a double-sided adhesive tape that is placed on the underside of AMTU 20. This tape can be of the type that has an adhesive that will allow AMTU 20 to be stuck to one location on Appliance Being Monitored 10, and then subsequently be picked up, moved, and stuck to another location on the appliance (or even another appliance to be monitored) several times, if desired. And finally, in another alternate embodiment, the Attachment Apparatus 22 would consist of several Velcro™ strips. AMTU 20 could be mounted anywhere (including non-metallic locations) on the Appliance Being Monitored 10 by a Velcro™ strip that is placed on the underside of AMTU 20 and stuck to a mating Velcro™ strip attached to the Appliance Being Monitored 10.

A problem with any system that monitors the steady-state mechanical vibration of an appliance or other machine is the exaggerated transient signal generated by Vibration Sensor 24 and subsequently sent through Signal Conditioning Circuitry 30 (both part of AMTU 20) created by an unwanted transitory mechanical "Bang" of the appliance or machine being monitored. This transitory mechanical "Bang" is actually unwanted "noise" for the monitoring system. Note that this problem can occur if Vibration Sensor 24 is either an accelerometer, as in FIG. 2, or a velocity sensor, as in FIG. 3. The amplitude of this transient electrical signal created by the unwanted transitory mechanical "Bang" can easily be 10 to 50 times the amplitude of the normal "steady-state" vibration signal that occurs during the normal "On" operation of the appliance or machine being monitored. If enough of these transitory mechanical "Bangs" (which generate accompanying large transient electrical signals within AMTU 20) occur within a reasonably short period of time, and then suddenly cease to occur, a "false triggering" of the "end of cycle" transmission from AMTU 20 can be initiated.

Figure 9:
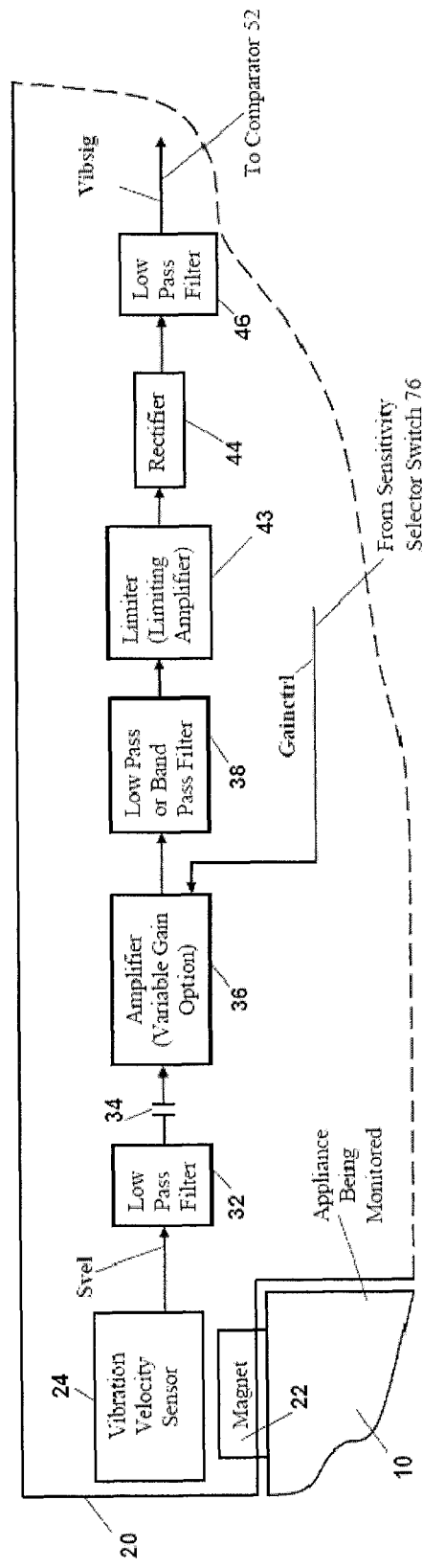
FIG. 9 illustrates a partial view of a block diagram of another exemplary embodiment of a monitor and transmitter unit according to the teachings of the present invention.

In order to reduce the exaggerated response of AMTU 20 to unwanted, transitory mechanical "Bangs," Limiter (Limiting Amplifier) 43 circuit is employed, which can be inserted into the signal conditioning circuitry of AMTU 20 of either FIG. 2 or FIG. 3. For clarity, we have modified FIG. 3 (which uses a velocity sensor as Vibration Sensor 24) to produce FIG. 9, which shows Limiter (Limiting Amplifier) 43 inserted in Signal Conditioning Circuitry 30 between the output of the Signal Conditioning amplifiers and filters and just before Rectifier 44. Note that Limiters 43x, 43y, and 43z could also be inserted in FIG. 2, just before Rectifier 44x, Rectifier 44y, and Rectifier 44z respectively. Another benefit of Limiter (Limiting Amplifier) 43 is to reduce the system's reliance upon the actual amplitude of the "steady-state" vibration of the appliance or machine being monitored, when it is operating in a normal "On" mode. As long as the output of Vibration Sensor 24 and its associated Signal Conditioning amplifiers and filters produce some reasonable signal output amplitude, when the appliance or machine being monitored is "On" and operating normally, AMTU 20 can detect that the appliance or machine is "On." We don't care what the actual amplitude of the "steady-state" vibration is, as long as AMTU 20 can determine that the appliance or machine is "On" or "Off." This means we may need fewer sensitivity ranges for Sensitivity Selector Switch 76.

Figure 10:
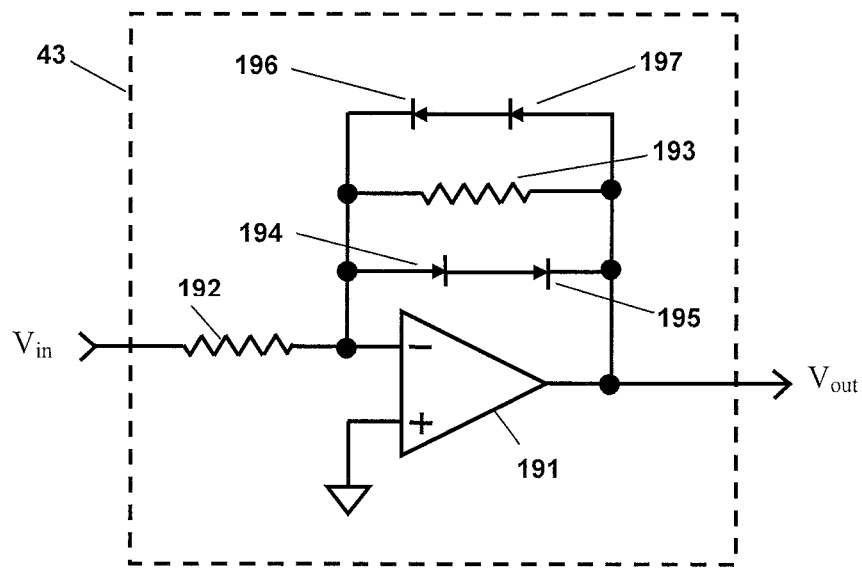
FIG. 10 illustrates a block diagram of an exemplary limiter according to the teachings of the present invention.

FIG. 10 shows one simple, straightforward embodiment of Limiter (Limiting Amplifier) 43. This, of course, does not preclude many other methods of implementing such a Limiter. This embodiment consists of Operational Amplifier 191, an input Resistor 192 (also called $R_{in}$), and a feedback network consisting of Resistor 193 (also called $R_f$), Diode 194, Diode 195, Diode 196, and Diode 197. Note that all four diodes are simple small signal diodes (such as 1N4148 or 1N914 diodes) with a forward diode voltage drop (called $V_d$) of about 0.6 Volts each. When they are reverse biased, they are off, with an extremely high resistive impedance, and no current flows through them, except an extremely small leakage current in the range of nanoamps ($10^{-9}$ amps) or less. The input voltage signal to this circuit (called $V_{in}$) comes from the output voltage signal of Vibration Sensor 24 and its associated Signal Conditioning amplifiers and filters. The output voltage signal (called $V_{out}$) of this circuit goes to Rectifier 44.

Figure 11:
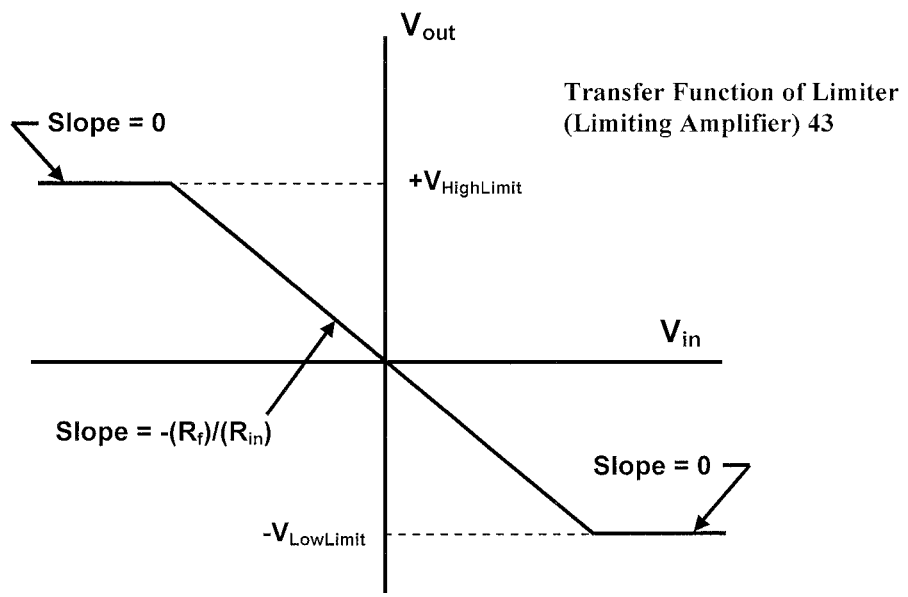
FIG. 11 illustrates a graph depicting a transfer function of an exemplary limiter according to the teachings of the present invention.

A discussion of the operation of this embodiment of Limiter (Limiting Amplifier) 43 will now be presented. For clarity, the transfer function of the circuit is shown in FIG. 11. First, we will assume that the operation of Operational Amplifier 191 is very close to that of an ideal Operational Amplifier (otherwise called an Op Amp) This means that the voltage difference between the inverting (−) input and the non-inverting (+) input of the Op Amp is essentially zero Volts. Also, the impedance looking into these two inputs is essentially infinite (very, very high) and no current flows into or from them. In a real world Op Amp, very small bias currents and very small offset voltages occur, but they are so small we shall ignore them here. Since the non-inverting (+) input of the Op Amp is connected to ground (0 Volts), then, due to the ideal operation of the Op Amp, the inverting (−) input is also at 0 Volts. This means that the voltage across the feedback network, consisting of Diodes 194, 195, 196, and 197 and Resistor 193, is simply the output of Operational Amplifier 191, which is also just the output voltage signal, $V_{out}$, of the Limiter (Limiting Amplifier) 43. When this output signal, $V_{out}$, falls between +1.2 Volts and −1.2 Volts (approximately), Diodes 194, 195, 196, and 197 are off, since they are either back-biased or there is not enough forward voltage from $V_{out}$ to turn them on. This means that Diodes 194, 195, 196, and 197 are essentially out of the circuit, and the circuit becomes a simple linear inverting amplifier with a gain of $(-R_f/R_{in})$, or:

$$V_{out} = (-R_f/R_{in}) * V_{in},$$

as is shown in FIG. 11.

When the equation for $V_{out}$ (just shown above) would normally produce an output voltage $V_{out}$ greater than +1.2 Volts, Diodes 96 and 97 turn on (while Diodes 194 and 195 remain off, since they are back biased) and limit output voltage $V_{out}$ from going any higher than +1.2 Volts, which is the sum of the forward voltage drops of Diodes 196 and 197. When the equation for $V_{out}$ (shown above) would normally produce an output voltage $V_{out}$ less than −1.2 Volts, Diodes 194 and 195 turn on (while Diodes 196 and 197 remain off, since they are back biased) and limit output voltage $V_{out}$ from going any lower than −1.2 Volts, which is the sum of the forward voltage drops of Diodes 194 and 195. It must be pointed out that this design does not preclude the use of zener diodes for Diodes 194 and 196, or preclude the omission of Diodes 194 and 196 (and replace them with 0 ohm jumpers) so as to produce different high and low limit voltages, other than +1.2 Volts and −1.2 Volts. The "limited" $V_{in}$ to $V_{out}$ relationship is clearly shown in FIG. 11 and shows generally defined $V_{HighLimit}$ and $V_{LowLimit}$ values. In the particular embodiment we have been discussing here, $V_{HighLimit}$ equals +1.2 Volts and $V_{LowLimit}$ equals −1.2 Volts.

Figure 12:
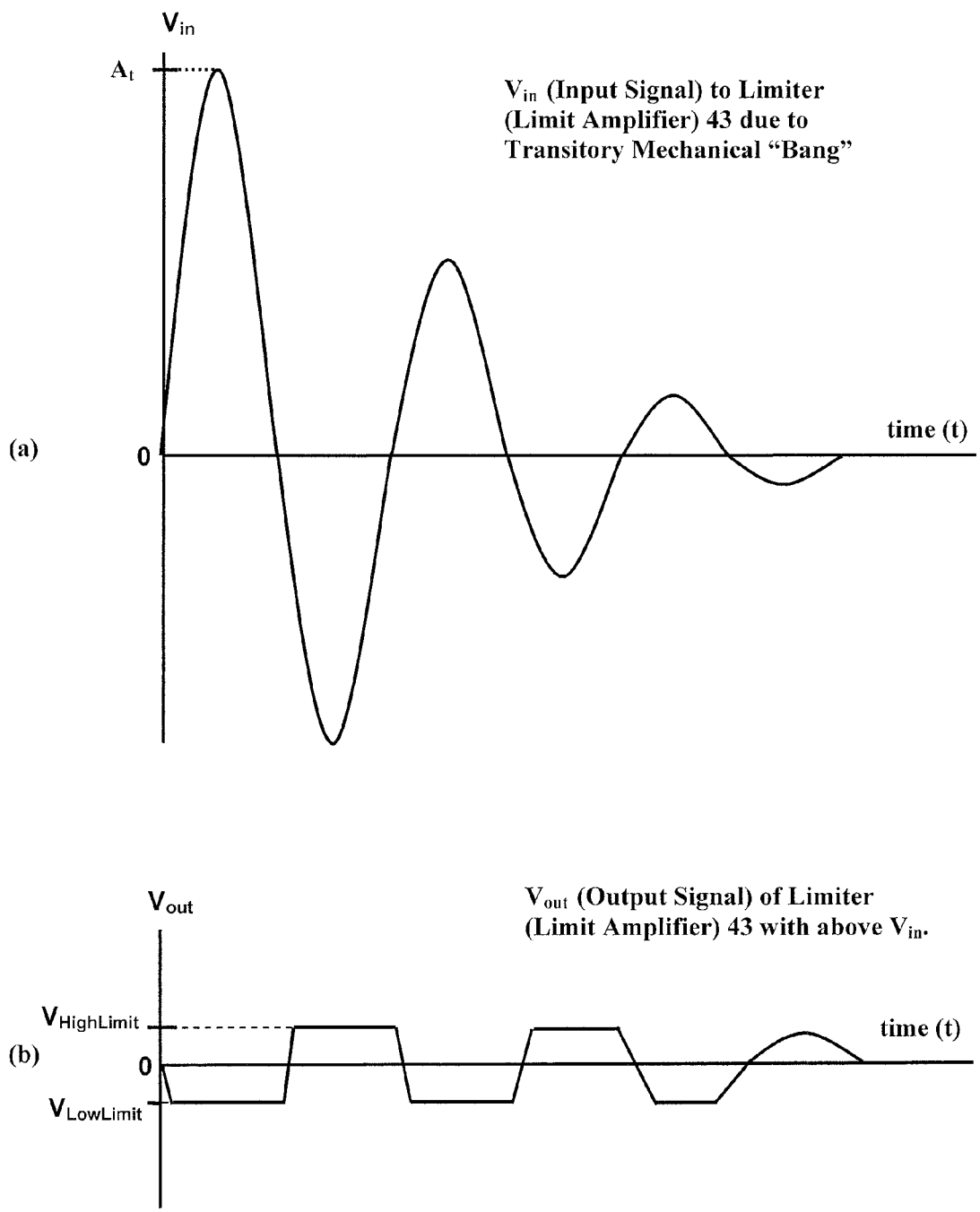
FIG. 12 illustrates a graph depicting functions of an exemplary limiter according to the teachings of the present invention.

FIG. 12 shows how the operation of Limiter (Limiting Amplifier) 43 greatly reduces the amplitude of these unwanted "noise" signals. FIG. 12(*a*) shows an input signal, $V_{in}$, to Limiter 43 created by a transient mechanical "Bang" of the appliance or machine being monitored, which comes from Vibration Sensor 24 through its accompanying Signal Conditioning Amplifier and Filtering Circuitry. As stated before, the maximum amplitude $A_t$ of this transient signal may be 10 to 50 times the normal amplitude of the "steady-state" vibration of the appliance or machine being monitored, when it is "on" and running normally. The transient signal does eventually decay due to the inherent mechanical dampening factor of the appliance or machine being monitored. FIG. 12(*b*) shows the output signal of Limiter 43. It clearly shows that Limiter 43 greatly reduces or "limits" the amplitude of this unwanted signal. It, therefore, greatly reduces the effect of this unwanted "noise" on the moving average of the magnitude of the appliance's vibration, created by Rectifier 44 and Low Pass Filter 46. And, thus, it greatly reduces the chance of a "false triggering" of an "end of cycle" transmission from AMTU 20.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An appliance or machine monitoring system, comprising:
   a monitor and transmitter unit configured to monitor an operation cycle of an appliance or machine and transmit a wireless signal upon completion of the operation cycle, the monitor and transmitter unit includes:
      an operation cycle sensor, the operation cycle sensor generates signals based upon operation status of the appliance or machine,
      a signal conditioner, the signal conditioner receives and modifies signals generated by the operation cycle sensor,
      a comparator, the comparator compares amplitude of the modified signals with a predetermined amplitude trip point, the comparator generates a signal once the amplitude of the modified signal falls below the predetermined amplitude trip point for a predetermined time period to indicate completion of the operation cycle of the appliance or machine being monitored,
      a wireless transmitter broadcasting a wireless signal based upon the signal generated by the comparator; and
   a portable receiver and alert unit configured to receive signals generated by the wireless transmitter and generate a signal indicative of completion of the operation cycle of the appliance or machine.

2. The monitoring system of claim 1, further comprising a sensitivity selection switch and circuitry configured to cause the amplitude of the signals generated by the signal conditioner to be greater than the predetermined amplitude trip point during the operating cycle of the appliance.

3. The monitoring system of claim 2, further comprising a sensitivity selection switch and circuitry, the sensitivity selection switch and circuitry adjusts amplitude of the signals generated by the signal conditioner, adjusts the predetermined amplitude trip point, or both.

4. The monitoring system of claim 1, wherein the modified signals generated by the signal conditioner includes a moving average amplitude that is greater than the predetermined amplitude trip point when the appliance being monitored is in operation.

5. The monitoring system of claim 4, wherein the signal conditioner includes a limiter for limiting amplitude.

6. The monitoring system of claim 4, wherein the signal conditioner includes a rectifier and low pass filter.

7. The monitoring system of claim 1, wherein the operation cycle sensor senses velocity or acceleration along multiple axes and generates signals indicative of said velocity or acceleration for each of said multiple axes.

8. The monitoring system of claim 7, wherein the signal conditioner includes a signal combining circuit that sums the signals generated by the operation cycle sensor.

9. The monitoring system of claim 8, wherein the signal combining circuit further determines a square root of the sum of the squares of the signals generated by the operation cycle sensor.

10. The monitoring system of claim 1, wherein the operation cycle sensor comprises a vibration sensor.

11. The monitoring system of claim 1, wherein the operation cycle sensor comprises an accelerometer sensor.

12. The monitoring system of claim 11, wherein the accelerometer sensor generates signals indicative of acceleration along three axes.

13. The monitoring system of claim 1, wherein the operation cycle sensor comprises an audio sensor.

14. The monitoring system of claim 1, wherein the operation cycle sensor comprises a magnetic field sensor.

15. The monitoring system of claim 14, wherein the magnetic field sensor is disposed about a power cord of an appliance or machine.

16. An appliance or machine monitoring system, comprising:
   a monitor and transmitter unit configured to monitor an operation cycle of an appliance or machine and transmit a wireless signal upon completion of the operation cycle, the monitor and transmitter unit includes:
      a three-axis accelerometer sensor, the accelerometer sensor generates signals indicative of acceleration of the appliance or machine along three axes, a signal conditioner, the signal conditioner receives and modifies signals generated by the accelerometer sensor to form a moving average amplitude, a comparator, the comparator compares the average amplitude of the modified signals with a predetermined amplitude trip point, the comparator generates a signal once the average amplitude falls below the predetermined amplitude trip point for a predetermined time period to indicate completion of the operation cycle of the appliance or machine being monitored, a sensitivity selector switch, the sensitivity selector switch being configured to adjust amplitude of the average amplitude, adjust the predetermined amplitude trip point, or both, a wireless transmitter, the wireless transmitter broadcasts a wireless signal based upon the signal generated by the comparator, a DC battery providing power to components of the monitor and transmitter unit, a housing unit configured for supporting and housing components of the monitor and transmitter unit, a releasable attachment unit configured for releasable attachment of the monitor and transmitter unit to a surface of the appliance or machine; and a portable receiver and alert unit configured to receive signals generated by the wireless transmitter and generate an audio, visual or audio and visual alert indicating completion of the operation cycle of the appliance or machine, the portable receiver and alert unit circuitry being powered by a DC battery.

17. A method of monitoring an operation cycle of an appliance or machine, comprising the steps of:

connecting an operation cycle sensor to an appliance or machine, the operation cycle sensor generates signals based upon operation cycles of the appliance or machine;

conditioning the signals generated by the operation cycle sensor to form a moving average amplitude that is greater than an amplitude setting of a predetermined amplitude trip point when the appliance or machine being monitored is in operation;

monitoring time periods after the moving average amplitude falls below the amplitude setting of the predetermined amplitude trip point to indicate completion of the operation cycle of the appliance or machine being monitored;

transmitting a wireless signal after the time period exceeds a predetermined time value; and generating an audio or visual alert signal based upon the wireless signal received by the portable receiver and alert unit.

18. The method of claim 17, wherein the operation cycle sensor comprises an accelerometer.

19. The method of claim 17, wherein accelerometer generates a plurality of electrical signals indicative of acceleration of the sensor along multiple axes.

20. The method of claim 19, wherein conditioning of the signals include summing the signals generated by the operation cycle sensor.

21. The method of claim 17, further comprising the step of adjusting the amplitude of the average amplitude, adjusting the amplitude of the predetermined amplitude trip point, or both.

* * * * *